United States Patent [19]

Mishra

[11] Patent Number: 5,077,597
[45] Date of Patent: Dec. 31, 1991

[54] MICROELECTRONIC ELECTRON EMITTER
[75] Inventor: Umesh K. Mishra, Goleta, Calif.
[73] Assignee: North Carolina State University, Raleigh, N.C.
[21] Appl. No.: 568,901
[22] Filed: Aug. 17, 1990
[51] Int. Cl.$^5$ .......................................... H01L 29/12
[52] U.S. Cl. ........................................ 357/58; 357/16
[58] Field of Search ................... 357/30 E, 30 F, 58, 357/16, 4, 30 I; 313/385, 386, 336, 542

[56]  References Cited

U.S. PATENT DOCUMENTS

| | | | |
|---|---|---|---|
| 3,699,404 | 10/1972 | Simon et al. | 357/30 B |
| 4,000,503 | 12/1976 | Matare | 357/16 |
| 4,410,902 | 10/1983 | Malik | 357/58 |
| 4,471,370 | 9/1984 | Chen et al. | 357/16 |
| 4,654,609 | 3/1987 | Dixon, Jr. et al. | 357/17 |
| 4,667,211 | 5/1987 | Iafrate et al. | 357/4 |
| 4,682,196 | 7/1987 | Sakai et al. | 357/58 |
| 4,686,556 | 8/1987 | Dietrich | 357/58 |
| 4,728,997 | 3/1988 | Szydlo et al. | 357/58 X |
| 4,794,440 | 12/1988 | Capasso et al. | 357/34 |
| 4,825,265 | 4/1989 | Lunardi et al. | 357/16 |
| 4,833,921 | 5/1989 | Longo et al. | 73/753 |

OTHER PUBLICATIONS

Pederson, D. et al., *Introduction to Electronic Systems, Circuits, and Devices*, McGraw-Hill, 1966, pp. 377-378.
Nelson, Richard B., *Klystrons*, pp. 9-29.

*Primary Examiner*—Andrew J. James
*Assistant Examiner*—Sara W. Crane
*Attorney, Agent, or Firm*—Bell, Seltzer, Park & Gibson

[57] ABSTRACT

A planar doped barrier region of semiconductor material is coupled to a vacuum or gaseous region to provide electron emission from the planar doped barrier region into the vacuum or gaseous region. When a voltage is applied across the planar doped barrier region electrons flow from one end of the region to another. This flow results in the emission of electrons if the work function of the emission surface is less than the bandgap of the semiconductor material. The device of the present invention can be used as a vacuum microelectronic emitter, a vacuum microelectronic transistor, light source, klystron, or travelling wave tube.

17 Claims, 5 Drawing Sheets

MICROELECTRONIC ELECTRON EMITTER

FIELD OF THE INVENTION

This invention relates generally to microelectronic devices and, more particularly, to microelectronic electron emitter structures.

BACKGROUND OF THE INVENTION

Electron emitters, also known as field emitters, are well known in the microelectronics art. Such emitters are widely used to emit electrons into a vacuum or gaseous region in electron beam lithography tools, scanning tunnel microscopes, electron guns, field ionizers, vacuum integrated circuits, and other devices.

There are two general classes of emitters, known as "hot" and "cold" emitters. Typically, cold emitters are microelectronic structures with small protruding points. Quantum mechanical tunnelling causes the points to emit an electron beam upon application of an appropriate voltage thereto. A major problem for conventional cold emitters is the extremely large electric field needed to emit electrons from the device surface, leading to the need to concentrate the electric field. In order to concentrate the electric field, conventional cold emitters are formed with a pointed emission surface. These pointed microelectronic structures are difficult to fabricate. In particular, the fine geometries of emitter arrays and the delicate point structures result in a very complex and expensive fabrication process. In addition, because of the complexity of the process a high quality emitter point is difficult to achieve.

The second class of emitters, known as "hot" emitters, use a reverse-biased p-n junction to generate a high current density of electrons for emission, without the need for field concentrating microelectronic points. Here minority carriers are injected into the depletion region of the junction and are accelerated by the large electric field within the region. For the electron population to remain "hot", the distance over which they are accelerated should not be larger than the mean free path for electrons. Since the current injected into the junction is of the order of the reverse biased saturation current of a p-n junction, it is necessary to increase the magnitude of this current to achieve a reasonable current density in the vacuum. The only way to multiply the current is through impact ionization which thermalizes the electron population and hence decreases the efficiency of emission. Another scattering mechanism that substantially cools the injected hot electron distribution is plasmon-phonon scattering in the n+ region required to bias the p-n junction. The n+ thickness should be minimized to minimize electron scattering but has to be maximized to decrease input resistance and hence increase efficiency. These contrasting needs lead to inefficiency. So far, the maximum reported efficiency obtained using a reverse biased p-n junction emitter is about eight (8%) percent.

In conclusion, known emitters either require pointed emitter surfaces which are difficult to accurately fabricate, or require reverse biased p-n junctions which are highly inefficient. Accordingly, known emitters have been expensive, inefficient, or both.

SUMMARY OF THE INVENTION

It is therefore an object of the present invention to provide an improved electron emitter.

It is another object of the present invention to provide an emitter which does not require a pointed emission surface.

It is still another object of the present invention to provide an emitter with improved efficiency.

These and other objects of the present invention are accomplished by an electron emitter which includes a planar doped barrier region of semiconductor material to provide electron emission into a vacuum or gaseous region coupled thereto. When a voltage is applied across the planar doped barrier region, electrons flow from one end of the region to another. This flow results in the emission of electrons from the other end, into the vacuum or gaseous region coupled thereto, if the work function of the emission surface at the other end is less than the bandgap of the semiconductor material. As is known to those having skill in the art, the work function is the minimum energy required to remove an electron from the Fermi level of a material into free space, and the bandgap of a material is the difference in energy between the energy level of the bottom of the conduction band and the energy level of the top of the valence band.

The planar doped barrier region of the present invention may comprise an n+-i-p+-i-n+ epilayered structure, for example, as disclosed in U.S. Pat. No 4,410,902 entitled "Planar Doped Barrier Semiconductor Device" issued to Malik, et al. The planar doped barrier is the p+ layer and the emission surface is one of the n+ layers. According to the invention, in order for emission to take place, the energy bandgap of the barrier layer (the sheet of acceptors or p+ layer) must be greater than the emission surface work function of the device. The emission surface work function of the device can be reduced by coating the emission surface with cesium or other work function lowering coatings.

The planar doped barrier emitter may be incorporated into vacuum microelectronic transistor arrays or microelectronic emitter arrays, or be used in a vacuum triode, klystron, or traveling wave tube. The planar doped barrier emitter provides increased efficiency because a reverse biased p-n junction need not be used to generate electrons. Simplified and inexpensive manufacture is also provided since pointed microelectronic structures are not required.

DETAILED DESCRIPTION OF THE INVENTION

The present invention will now be described more fully hereinafter with reference to the accompanying drawings, in which a preferred embodiment of the invention is shown. This invention may, however, be embodied in many different forms and should not be construed as limited to the embodiment set forth herein; rather, this embodiment is provided so that this disclosure will be thorough and complete, and will fully convey the scope of the invention to those skilled in the art.

Like characters refer to like elements throughout. For greater clarity, the size of the elements has been exaggerated.

Figure 1:
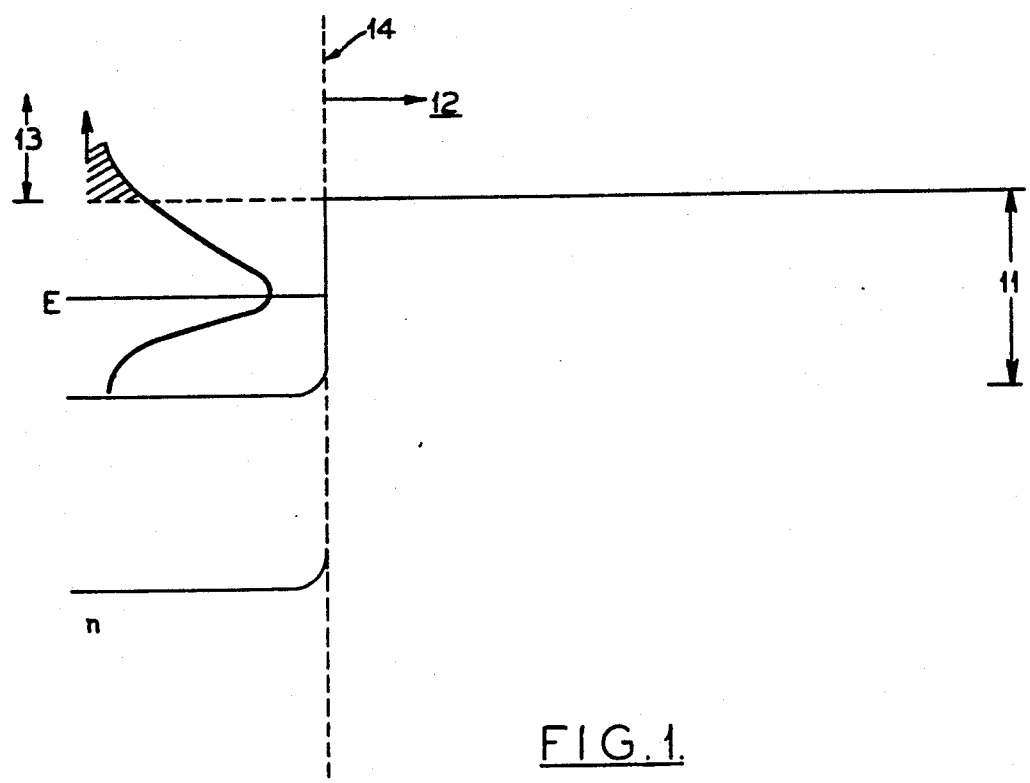
FIG. 1 illustrates an energy band diagram showing hot electron distribution near a semiconductor-vacuum interface.

Traditionally, electrons have been emitted from a semiconductor surface through the use of a large current density at the semiconductor surface. This method is known as "hot" electron emission. The usual means of generating a sufficient hot electron population has been a reverse biased p-n junction. In traditional devices, minority carriers are injected into the junction's depletion region and are accelerated by a large electric field within the depletion region. In order for the electron population to remain hot, the distance over which the electrons are accelerated should not be larger than the mean free path for electrons in order to avoid scattering events. As shown in FIG. 1, at the surface of the device, electrons with a kinetic energy larger than the surface work function 11 exit the semiconductor surface 14, and are emitted into a vacuum or other region 12. In FIG. 1, electrons whose kinetic energy is in the range denoted as 13, i.e., whose kinetic energy is greater than the surface work function 11, will be emitted from the semiconductor surface 14. The drawback to the traditional method is that the maximum reported efficiency obtained is about 8%. In contrast, the efficiency of the field emitter of the present invention is higher. An efficiency of about 60% may be expected.

A higher efficiency is obtained according to the present invention by employing a planar doped barrier region in the field emitter. The planar doped barrier region may comprise an n+-i-p+-i-n+ structure. In other words, an extremely narrow p+ planar region is positioned between adjoining regions of intrinsic semiconductor material. This type of device is disclosed in U.S. Pat. No. 4,410,902 entitled, "Planar Doped Barrier Semiconductor Device", which issued to Roger J. Malik on Oct. 18, 1983, the disclosure of which is expressly incorporated herein by reference.

Figure 2B:
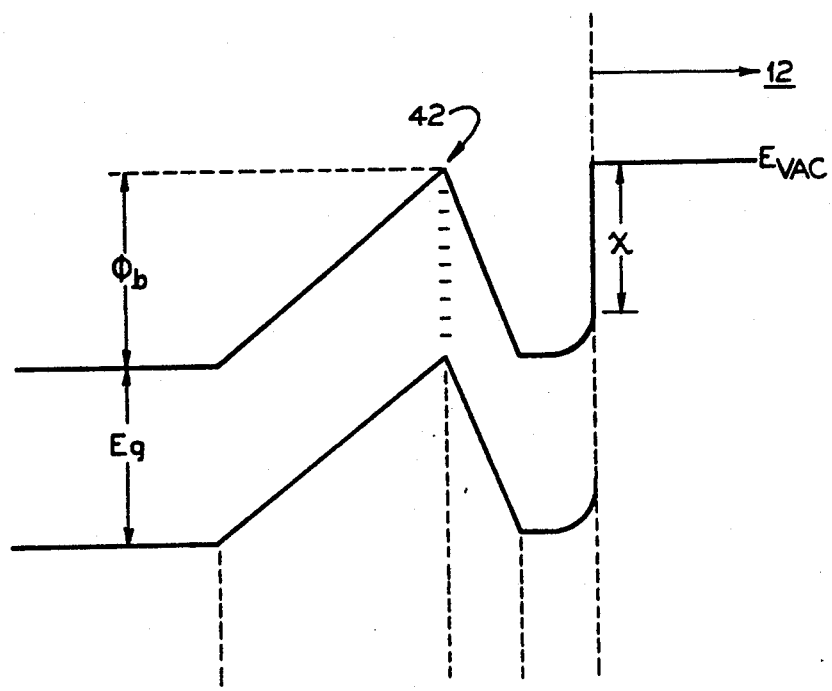
FIGS. 2a, b, and c illustrate the general structure and operation of a planar doped barrier emitter according to the present invention.
Figure 2A:
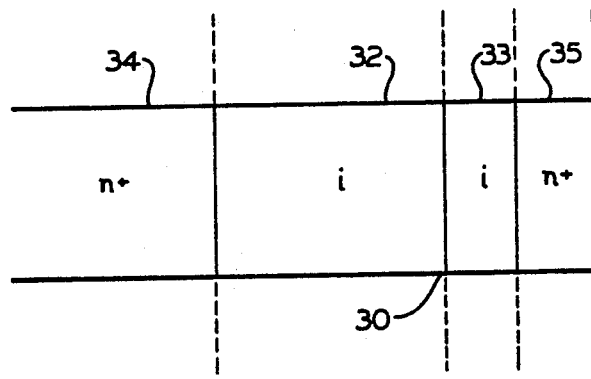

The general operation of an electron emitter of the present invention as a source of hot electrons is shown in FIG. 2. FIG. 2a shows a schematic cross-section of a planar doped barrier in a semiconductor. The planar doped barrier consists of a sheet of acceptors 30 spaced between two intrinsic semiconductor layers 32 and 33 with n+ layers 34 and 35 at each end. The energy barrier $\phi_b$ of the device, seen in FIG. 2b, is related to the unintentional or intentional doping of the regions 32 and 33 and the thicknesses of the intrinsic regions. For the intrinsic case $\phi_b$ is given by the following equation:

$$\phi_b = \frac{(L_{inj} \times L_d)}{(L_{inj} + L_d)} \times \frac{Q_A}{\epsilon_s}$$

In this equation, $Q_A$= acceptor sheet density, $L_{inj}$ is the thickness 38 of the intrinsic injection region 32, $L_d$ is the thickness 40 of the intrinsic drift region 33, and $\epsilon_s$ is the dielectric constant of the semiconductor. The maximum barrier $\phi_{bm}$ is less than or equal to the bandgap of the semiconductor Eg. Thus, as seen in FIG. 2b, if the surface work function of the device is less than the maximum barrier, any electrons gaining full barrier height $\phi_{bm}$ and which do not encounter scattering events will have a high enough energy to surmount the surface barriers and enter the vacuum or other region 12. The semiconductor energy bandgap Eg for Si, GaAS, and Al.45Ga.55As are as follows:

Si: 1.1 eV
GaAs: 1.4 eV
Al.45Ga.55As: 2.1 eV

Figure 2C:
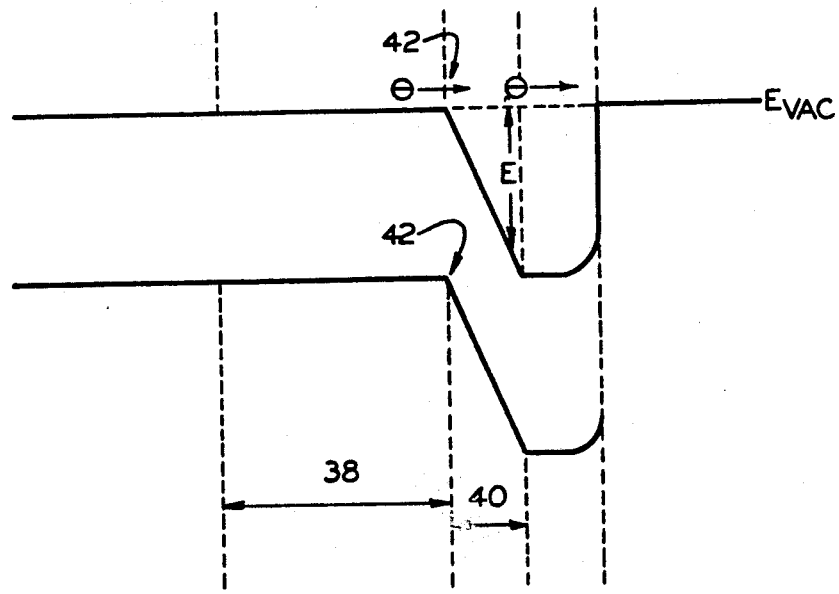

The maximum value of $\phi_b$ is $E_g$. Under forward biased conditions, as shown in FIG. 2c, electrons traverse the barrier 30 at point 42 ($\phi_{bm}$) and begin gaining kinetic energy. The electrons gain kinetic energy equal in amount to the magnitude of the barrier $\phi_{bm}$ when they are accelerated without scattering in the drift region 33. If the electrons' potential energy at point 42 is greater than the surface work function and the electrons encounter no scattering events, the potential energy of the electrons which is converted to kinetic energy is large enough to allow the electrons to escape from the semiconductor surface into the vacuum or other region 12 as shown in FIG. 2c. This can be contrasted with typical emitters using reverse biased conditions where electrons become trapped in the p region of the device.

Scattering events may occur within the drift region 33 which would reduce the kinetic energy of the electrons keeping them from being emitted from the semiconductor surface. With the instant device, electron scattering can be controlled by keeping the thickness 40 of drift region 33 equal to or less than the electron mean free path, thereby maintaining a large hot electron distribution (i.e., large numbers of electrons at the surface with energy larger than the surface work function).

Figure 3:
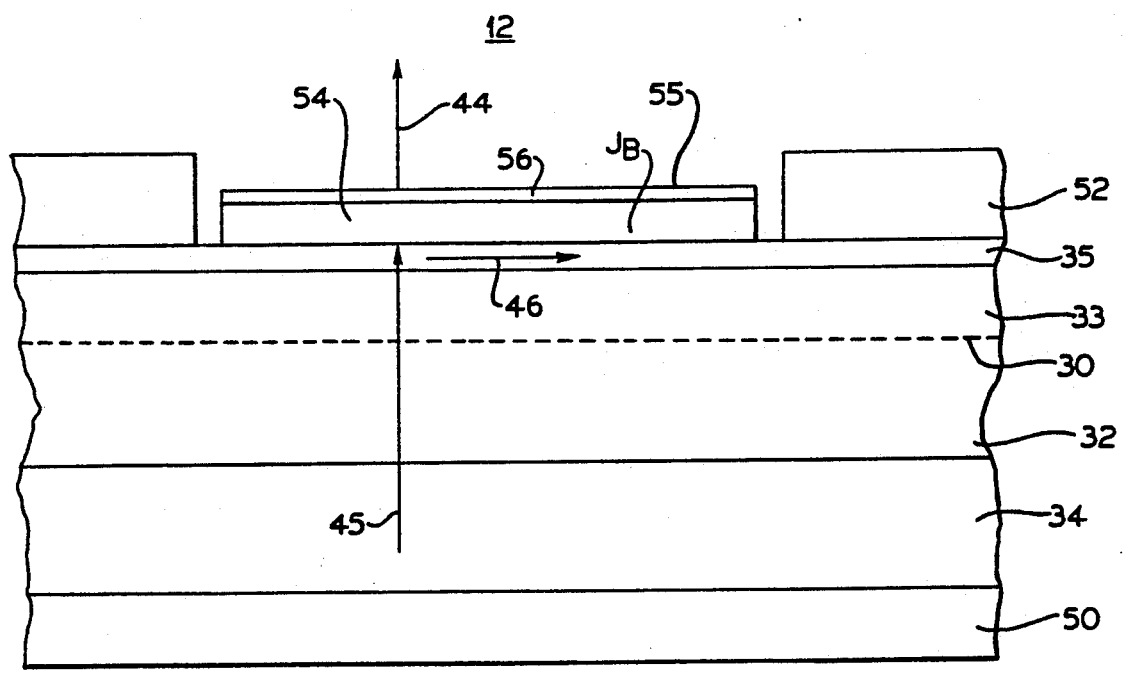
FIG. 3 illustrates a detailed structure of a planar doped barrier emitter according to the present invention.

Referring now to FIG. 3, the detailed structure of a field emitter according to the present invention is shown. A sheet of acceptors 30 is formed between two intrinsic layers 32 and 33. Typically, this sheet is a monolayer of p+ doped material. Preferably, the sheet of acceptors 30 should not be so large as to form a p-n junction in the device. A p-n junction should be avoided, since such a junction would result in a p region not totally depleted thereby deterring electron flow. The intrinsic layer may be formed of Si, GaAs, Al.45Ga.55As or any other semiconductor. Intrinsic layer 32 is the injection region which is typically 500 Å thick and intrinsic region 33 is the drift region which is typically 250 Å thick. Preferably, the thickness and doping of the injection region 32 is controlled since large injection regions and low doping levels lead to greater resistance and greater heat which reduces the efficiency of the device. The thickness of drift region 33 should also preferably be controlled so that it is smaller than the electron mean free path. If the drift region 33 is smaller than the electron mean free path, electron scattering events are avoided and a larger number of electrons are emitted from the device.

Two n+ layers 34 and 35 are formed on either side of the device. Layer 35 is typically less than 100 Å thick. Contact layer 35 may be composed of InAs to ease the formation of ohmic contacts to the surface. Contacts 50 and 52 are formed on exposed surfaces of the n+ regions 34. The contacts 50 and 52 may be formed of Au, Ge, Ni, or Au and are typically 2000 Å thick. If InAs is used for layer 35, Ti-Pt-Au may be used for contact 52. In addition, to further lower the work function of the emission surface 55, a work function lowering layer 56 may be formed on the emitter surface. Cesium and compounds of barium are appropriate work function lowering materials. Optionally, a silicon layer 54 approximately 25 Å thick may be formed on said n+ region in order to provide mechanical coupling between the work function lowering layer 56 and the n+ region 35. Typically, there is at least a 500 Å space between the contact 52 and the work function lowering layer 56. The work function lowering layer 56 may be necessary unless very large bandgap materials or those having a very small or negative surface work functions are used.

Emitters according to the present invention may be formed in silicon, gallium, arsenide, aluminum gallium arsenide, indium phosphide, or other semiconductor materials. The following Table describes typical materials and thicknesses for the components of the present invention. It will be understood by those having skill in the art that these values are only representative and are provided for illustration only.

TABLE

| Technology | Si | GaAs or AlGaAs |
|---|---|---|
| Contact 50-Material | Al | Au,Ge,Ni |
| Contact 50-Thickness | 2000 Å | 2000 Å |
| n+ Region 34-Material | Si | GaAs |
| n+ Region 34-Dopant | As | Si |
| n+ Region 34-Dopant Concentration | $1 \times 10^{19}$ cm$^{-3}$ | $5 \times 10^{18}$ cm$^{-3}$ |
| n+ Region 34-Thickness | Not critical | Not critical |
| Region 32-Material | Either intrinsic or doped lightly n(Si) | Either intrinsic or doped lightly n type (AlGaAs) |
| Region 32-Thickness | 500 Å | 500 Å |
| Planar Doped Layer 30 -Material | Si | AlGaAs |
| Planar Doped Layer 30 -Dopant | Bo | Be or C |
| Planar Doped Layer 30 -Dopant Concentration | $1 \times 10^{19}$ cm$^{-3}$ | $>1 \times 10^{19}$ cm$^{-3}$ |
| Planar Doped Layer 30 -Thickness | $<25$ Å | $<25$ Å |
| Intrinsic Region 33 -Material | Si | Al$_x$Ga$_{1-x}$As (graded material) |
| Intrinsic Region 33 -Thickness | 250 Å | 250 Å |
| n+ Region 35-Material | Si | GaAs or InAs |
| n+ Region 35-Dopant | As | Si |
| n+ Region 35-Dopant Concentration | $1 \times 10^{19}$ | $>1 \times 10^{19}$ cm$^{-3}$ |
| n+ Region 35-Thickness | 50 Å | $<50$ Å |
| Work Function Lowering Layer 55-Material | Cs | Cs |
| Work Function Lowering Layer 55-Thickness | $<10$ Å | $<10$ Å |

In operation, the planar doped barrier formed by the sheet of acceptors 30 accelerates electrons across the drift region 33 fast enough to overcome the work function of the surface with the work function lowering layer 56, as shown by arrow 45. The energy accelerating the electrons is obtained through the conversion of potential energy to kinetic energy between the acceptor layer 30 and drift region 33. Since the energy bandgap of the planar doped barrier structure is greater than the work function of the surface with the work function lowering layer 56, the electrons are emitted from the emission surface 55 into evacuated or gaseous region 12, as shown by arrow 44.

The efficiency of the device is a function of the total number of electrons emitted from the emission surface 55 of the device. In operation, the total number of electrons emitted into the vacuum, arrow 44, is reduced from semiconductor current, arrow 45, which is injected over the planar doped barrier 30 by a current arrow 46 which is collected by the n+ layer 35 at the emitter surface 55. The current $J_b$ is composed of electrons that have encountered scattering events in the intrinsic drift region 33 and were quantum mechanically reflected by the semiconductor vacuum interface.

Figure 4A:
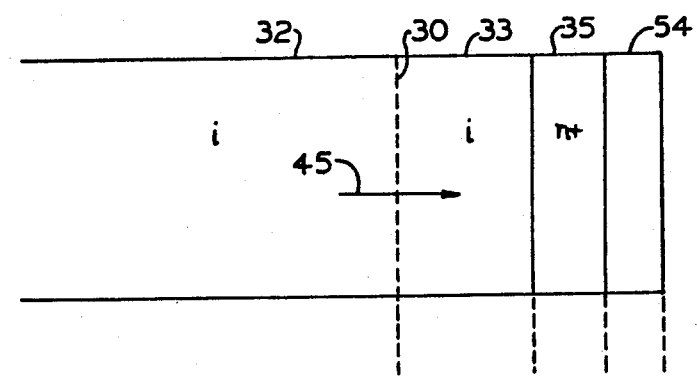
FIGS. 4a and b illustrate the detailed operation of the planar doped barrier emitter according to the present invention.
Figure 4B:
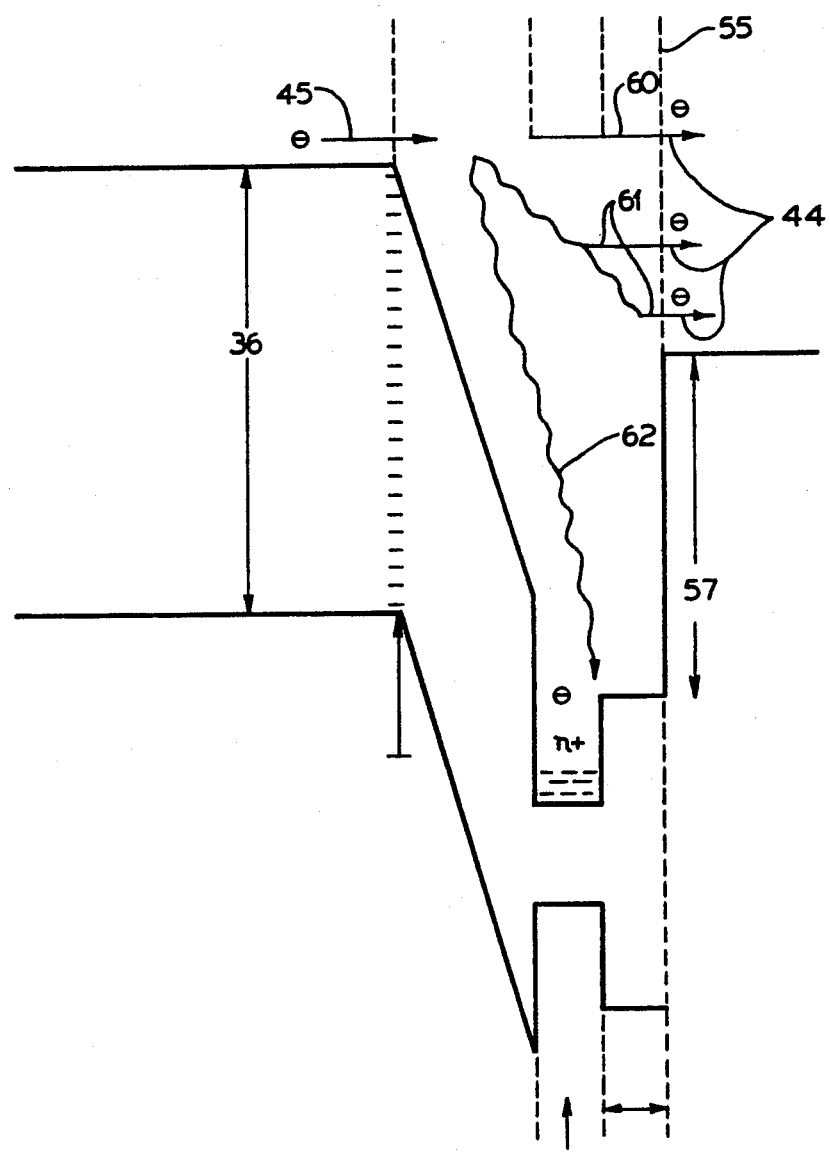

Referring now to FIGS. 4a-b, an energy band diagram of a planar doped barrier emitter is shown. In FIG. 4a an n+i-p+i-n+ structure is shown. Three differing paths for electrons crossing over the planar doped barrier 30 and the semiconductor current, arrow 45, are illustrated in 4b. Path 60 illustrates "ballistic" electrons which have an energy higher than that of the surface with the work function lowering layer 56. These electrons have encountered little or no scattering events and therefore have lost only a small amount of kinetic energy, allowing the electrons to escape the emission surface 55. The surface work function is shown at arrow 57.

Next, the electrons on the paths designated 61 are "quasi-ballistic" electrons which encounter some scattering events and lose some kinetic energy but still retain an energy value greater than the energy 57 of the work functioning lowering layer 56. The emitted vacuum current, shown collectively by arrows 44, is equal to the current from the ballistic electrons 60 and the quasi-ballistic electrons 61. The third electron path 62 shows "scattered" and "relaxed" electrons which constitute the current $J_b$. These electrons lose a great amount of kinetic energy through scattering events within the i and n+ regions 33 and 35. The energy value for these electrons is lower than the energy 57 of the surface work function lowering layer 56 and are therefore not emitted from the emission surface 55.

Figure 5:
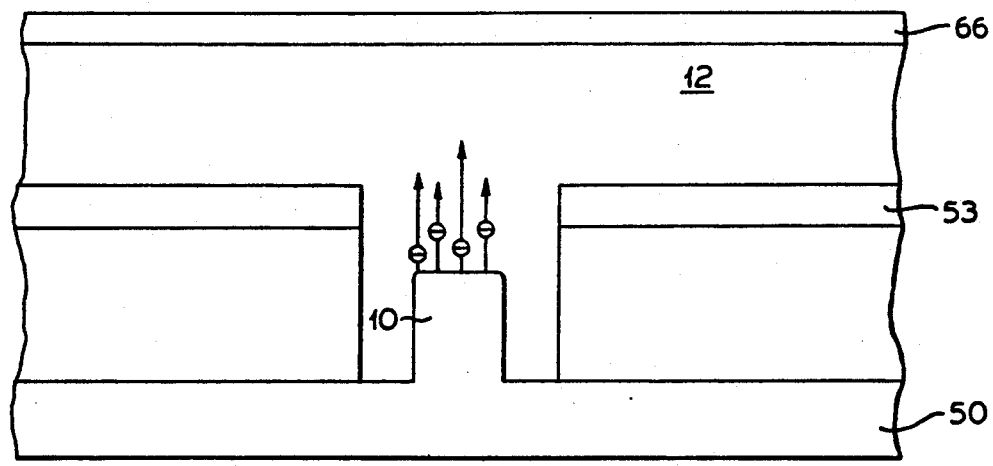
FIG. 5 is a schematic diagram of a vacuum microelectronic transistor including an emitter of the present invention.
Figure 7:
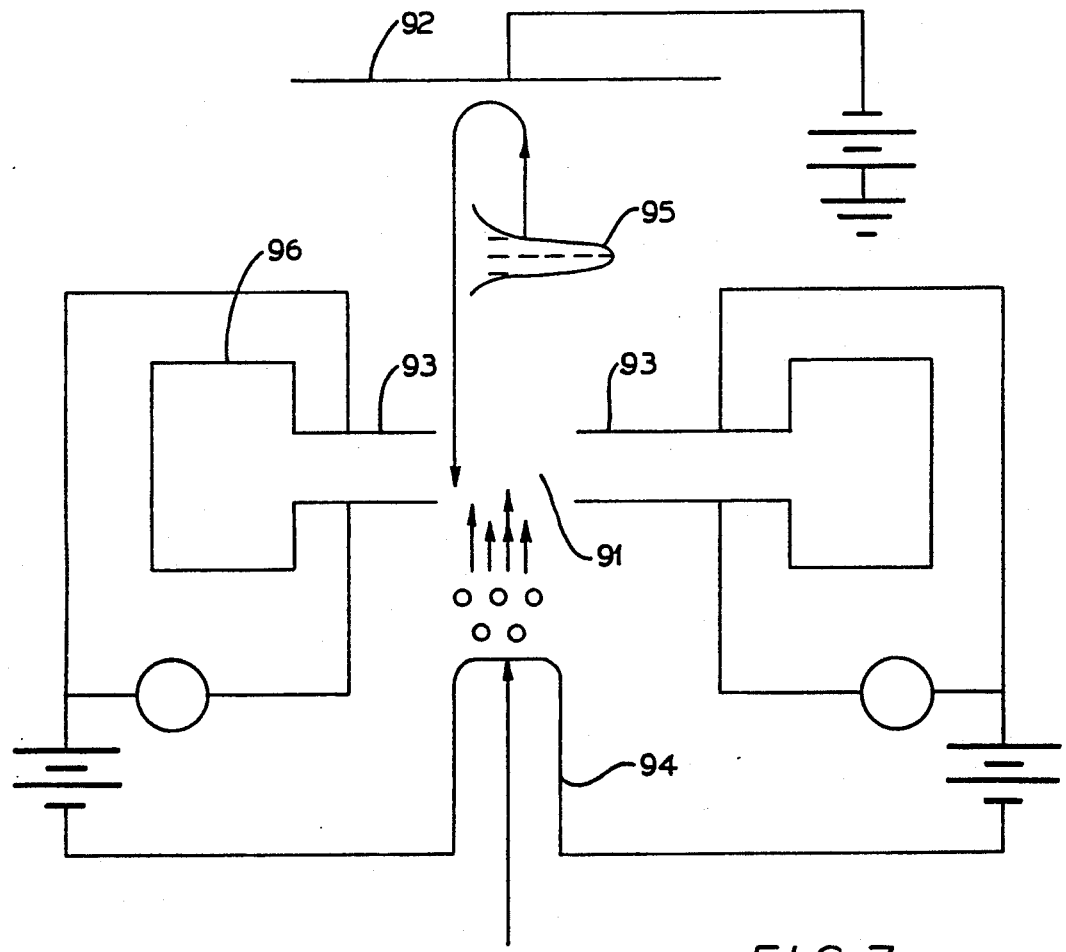
FIG. 7 illustrates a klystron using a planar doped barrier emitter of the present invention.
Figure 6:
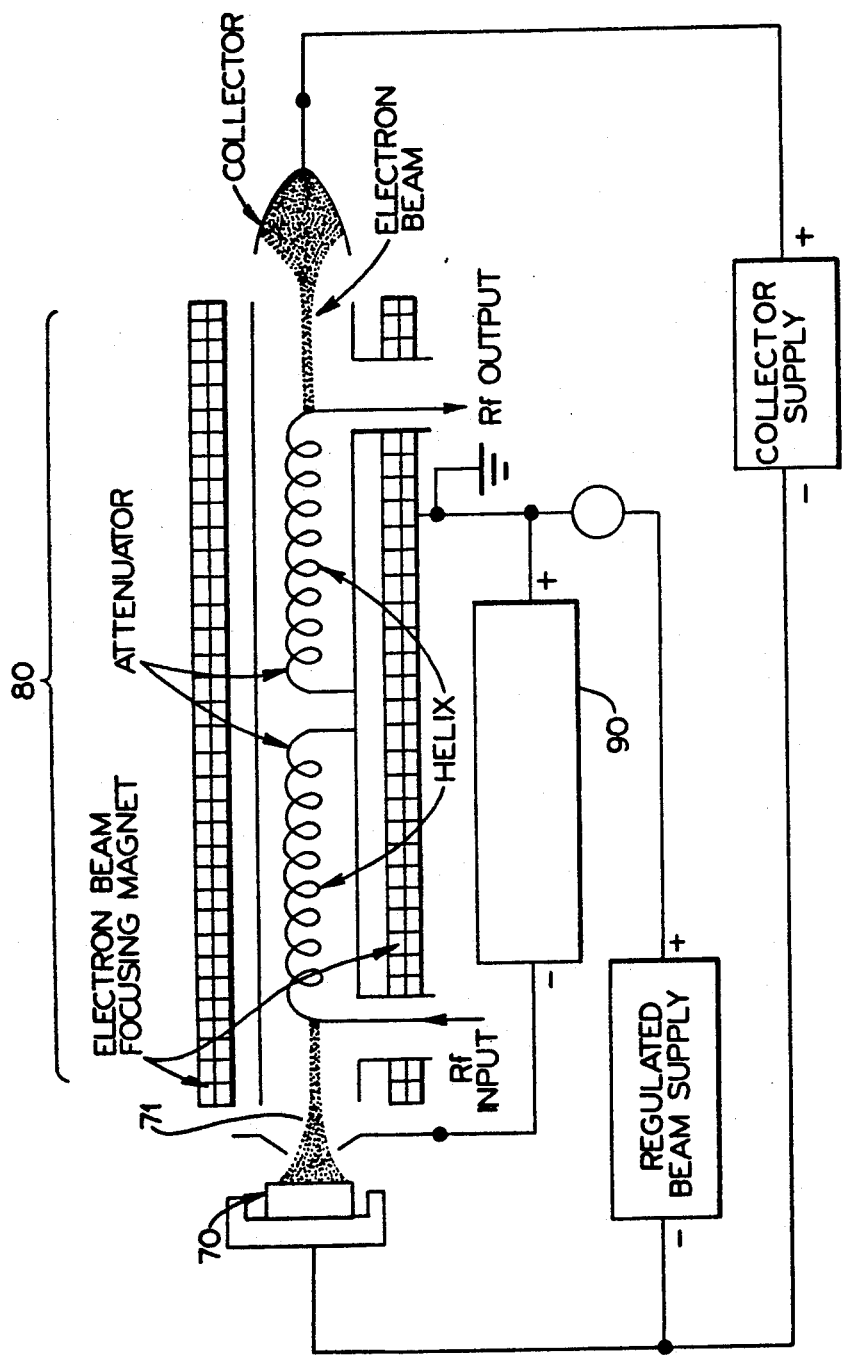
FIG. 6 illustrates a traveling wave tube using a planar doped barrier emitter of the present invention.

It will be understood by those having skill in the art that the emitter of the present invention has many applications for microelectronic devices. FIGS. 5-7 illustrate three of these applications. Referring now to FIG. 5, the planar doped barrier emitter is shown employed as a vacuum microelectronic transistor. In this embodiment of the invention, contacts 50 and 53 and anode 66 form the three contacts of the transistor. In operation, when the planar doped barrier diode is biased, electrons are emitted from the cathode 10 and strike anode 66. The electrons are extracted by the anode 66 potential and are modulated by the contact 53 potential. If the anode 66 is an electronically excited light emitting (electroluminescent) material, a vacuum integrated circuit light source is formed. If the emitter is modulated for transistor action the maximum rate at which electrons are supplied to the vacuum or gaseous region 12 is related to the charging time of the transistor. This charging time is analogous to the charging time of the diode of a bipolar transistor which determines the rate at which electrons can be injected into the base region. This charging time is the $R_B C_E$ product associated with the contact and sheet resistance associated with contact 53 and the capacitance of the diode between contacts 50 and 53. The advantage of this device is that the diode is always turned on with its purpose solely to supply a space-charge of electrons into the vacuum. The gate (or grid) layer modulates the emitted charge similar to vacuum tube transistors.

The planar doped barrier field emitter of the present invention can also be arranged in a massively paralleled array for electron beam lithography systems. An electron beam lithography system employing the emitter of the present invention will have a very high throughput and will be highly flexible. It would also have the ability to be completely software driven. An array of vacuum integrated circuit light sources may also be fabricated for use in flat panel displays, high definition television or other applications.

A major advantage of electron transport in a vacuum is the preservation of phase due to the lack of scattering events. This enables the implementation of several devices based on beam wave interaction such as klystrons and traveling wave tubes (TWT's). In the case of both these devices, the electron velocity is modulated by means of an applied electric field. This causes electrons drifting out of the modulating region to bunch into groups as electrons whose velocity is enhanced by the applied electric field run in to the electrons whose velocity has been reduced by the field. As is well known to those having skill in the art, the nature of the interaction of the drifting electron bunches with the applied signal, discrete in the case of a klystron and continuous in the case of a TWT, distinguishes the basic operation of these devices.

Referring now to FIG. 6, an example of a TWT is shown. The TWT of the present invention would incorporate the planar doped barrier emitter 70 of the present invention into a conventional TWT. In a TWT, a linear electron beam 71 passes through a circuit 80 which propagates an electromagnetic wave having a phase velocity approximately equal to the electron velocity. A signal injected on the electric beam from circuit 90 produces velocity modulation of the beam 71, which is converted by the bunching process to RF current modulation. During the bunching process, the peak of the electron density is out of phase with the peak of the electromagnetic wave causing the energy to be transferred from the electron stream. The interaction of the space-charge wave (i.e., the flow of the electrons) on the beam 71 with the circuit wave causes both to grow synchronously as they travel down the tube. RF energy is obtained from a reduction in average velocity of the electrons.

The preferred source of velocity modulation in the millimeter-wave and submillimeter-wave regime today is the single cavity reflex klystron shown schematically at FIG. 7. As shown in FIG. 7, the emitter of the present invention may be incorporated into a klystron. The planar doped barrier emitter 94 emits electrons through the modulating gap 91 forming electron bunches 95. The electron bunches 95 that are created by the modulating gap 91 are reflected by a reflector electrode 92 and are made to pass through the modulating grid 93 in reverse phase to the applied signal. This causes the velocity of the electrons to be slowed down by the applied signal which is equivalent to the electron beam transferring its kinetic energy to the applied signal. Consequently, the applied signal increases. This positive feedback results in oscillations and is related only to the phase of the incident electron beam which is reflected by the reflector plate. The frequency of the electron beam may be modulated by varying voltage on the reflector 92. Most reflex klystrons as shown in FIG. 7 have two modulator grids 93 to concentrate the electric field of the cavity in the modulating gap 91 through which the beam passes. The reflex klystron also has two output resonant cavities 96 which are used to couple the energy from the klystron to the outside world.

In summary, a field emitter can be formed using a planar doped barrier region. This structure obviates many of the problems with conventional field emitters such as the need for large electric fields, inefficiency, and complexity of manufacture. The planar doped barrier field emitter can be incorporated into many devices such as integrated circuit vacuum light emitting devices, vacuum transistors, electron beam lithography arrays, traveling wave tubes, and klystrons. The device may be coupled to a gaseous area as well as an evacuated area.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. An electron emitter comprising:
   a planar doped barrier region of semiconductor material, having a planar doped barrier between first and second planar doped barrier region ends, said planar doped barrier region comprising an n+-i-p+-i-n+ epilayered structure, with said planar doped barrier being said p+ layer, said first end being one of said n+ layers, and said second end being the other of said n+ layers;
   an evacuated or gaseous region coupled to said second end;
   means for applying a voltage between said first and second ends, to thereby cause electrons to flow from said first end, across said planar doped barrier and to said second end;
   the bandgap of said semiconductor material being greater than the work function of said second end to thereby cause electrons flowing to said second end to be emitted from said second end into said evacuated or gaseous region.

2. The electron emitter of claim 1 further comprising a work function lowering layer on said second end, for enhancing emission of electrons from said second end.

3. The electron emitter of claim 1 wherein said voltage applying means comprises a pair of electrical contacts on said first and second ends, respectively.

4. The electron emitter of claim 1 wherein said semiconductor material is chosen from the group consisting of aluminum gallium arsenide, gallium arsenide, silicon and indium phosphide.

5. The electron emitter of claim 2 wherein said work function lowering layer comprises a cesium layer.

6. The electron emitter of claim 1 wherein said second end is planar.

7. The electron emitter of claim 1 wherein said second end is planar and wherein said planar doped barrier is parallel to said second end.

8. The electron emitter of claim 1 further comprising:
   means for modulating the electrons emitted from said second end,
   whereby a vacuum microelectronic transistor is formed.

9. The electron emitter of claim 1 further comprising an electroluminescent target in the path of the electrons emitted from said second surface, whereby a microelectronic light source is formed.

10. The electron emitter of claim 8 further comprising a conductor target in the path of the modulated emitted electrons.

11. The electron emitter of claim 1 further comprising:
   means for modulating the velocity of the electrons emitted from second end,
   whereby a klystron or travelling wave tube is formed.

12. The electron emitter of claim 11 wherein said means for modulating comprises:
   an electrode plate, positioned on the side of said second end;
   a modulator grid having two ends, each of said ends including output resonant cavities and a modulator gap between said resonant cavities, said modulator grid positioned between said electrode plate and said emitter;
   whereby velocity modulation of said electrons emitted form said second end is provided when a bias is applied to said modulator grid and said electrode plate.

13. A method of emitting electrons comprising the steps of:
   providing a planar doped barrier region of semiconductor material, having a planar doped barrier between first and second planar doped barrier region ends, said planar doped barrier region comprising an n+-i-p+-i-n+ epilayered structure, with said planar doped barrier being said p+ layer said first end being one of said n+ layers, and said second end being the other of said n+ layers;
   coupling said second end to an evacuated or gaseous region; and
   applying a voltage between said first and second planar doped barrier region ends, to thereby cause electrons to flow form said first end, across said barrier and to said second end, and to launch electrons from said second end into said evacuated or gaseous region.

14. The method of claim 13 further comprising the step of:
   providing a work function lowering layer on said second end, for enhancing emission of electrons from said second end.

15. The method of claim 13 further comprising the step of:
   modulating the electrons emitted from said second end, to thereby provide a vacuum microelectronic transistor.

16. The method of claim 14 further comprising the step of:
   causing the electrons emitted from said second end to strike an electroluminescent target, to thereby provide a microelectronic light source.

17. The method of claim 13 further comprising the step of:
   modulating the velocity of the electrons emitted from said second end, to thereby provide a klystron or travelling wave tube.

* * * * *

UNITED STATES PATENT AND TRADEMARK OFFICE
CERTIFICATE OF CORRECTION

PATENT NO. : 5,077,597
DATED : December 31, 1991
INVENTOR(S) : Mishra

It is certified that error appears in the above-identified patent and that said Letters Patent is hereby corrected as shown below:

Column 4, lines 48-49, "$Al._{4\text{-}5}$" should be --$Al._{45}$--

Column 9, line 16, "form" should be --from--

Column 10, line 5, "form" should be --from--

Column 10, line 19, "14" should be --13--

Signed and Sealed this

Seventeenth Day of August, 1993

Attest:

BRUCE LEHMAN

Attesting Officer        Commissioner of Patents and Trademarks